US009430622B2

(12) United States Patent
Kacin et al.

(10) Patent No.: US 9,430,622 B2
(45) Date of Patent: Aug. 30, 2016

(54) MINI APPLIANCE

(75) Inventors: Martin Kacin, Palo Alto, CA (US); David Douglas Kloba, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 1002 days.

(21) Appl. No.: 13/182,145

(22) Filed: Jul. 13, 2011

(65) Prior Publication Data

US 2013/0016470 A1   Jan. 17, 2013

(51) Int. Cl.
*G06F 7/04* (2006.01)
*G06F 21/10* (2013.01)
*G06F 1/32* (2006.01)

(52) U.S. Cl.
CPC ............... *G06F 21/105* (2013.01); *G06F 1/32* (2013.01)

(58) Field of Classification Search
CPC ................................ G06F 1/32; G06F 21/105
USPC ........................................ 361/679.02; 726/26
See application file for complete search history.

(56) References Cited

U.S. PATENT DOCUMENTS

| | | | | |
|---|---|---|---|---|
| 6,108,782 A * | 8/2000 | Fletcher | ................... | G06F 8/65 370/245 |
| 6,182,226 B1 * | 1/2001 | Reid | ................... | H04L 29/06 709/225 |
| 6,523,027 B1 * | 2/2003 | Underwood | ................... | G06F 9/465 |
| 6,549,932 B1 * | 4/2003 | McNally | ................... | G06F 9/4862 709/202 |
| 6,601,233 B1 * | 7/2003 | Underwood | ................... | G06F 8/24 717/100 |
| 6,609,128 B1 * | 8/2003 | Underwood | ................... | G06F 9/4448 707/610 |
| 6,633,878 B1 * | 10/2003 | Underwood | ................... | G06Q 10/10 |
| 6,704,873 B1 * | 3/2004 | Underwood | ................... | H04L 63/02 709/223 |
| 6,718,535 B1 * | 4/2004 | Underwood | ................... | G06F 9/4443 717/101 |
| 7,100,195 B1 * | 8/2006 | Underwood | ................... | G06F 9/4443 707/999.009 |
| 7,433,942 B2 * | 10/2008 | Butt | ................... | H04L 41/046 709/202 |
| 7,756,958 B2 * | 7/2010 | Nagarajrao | ................... | H04L 12/24 370/254 |
| 7,917,605 B1 * | 3/2011 | McQuarrie | ................... | G06F 21/105 709/221 |
| 8,972,554 B2 * | 3/2015 | Lu | ................... | 709/223 |
| 2002/0075812 A1 * | 6/2002 | Corwin | ................... | H04L 63/10 370/254 |
| 2002/0161883 A1 * | 10/2002 | Matheny | ................... | H04L 41/0213 709/224 |
| 2005/0286515 A1 * | 12/2005 | Cheshire | ................... | 370/389 |
| 2006/0074618 A1 * | 4/2006 | Miller | ................... | G06F 9/45504 703/13 |
| 2006/0136923 A1 * | 6/2006 | Kahn | ................... | G06F 9/468 718/100 |
| 2008/0148253 A1 * | 6/2008 | Badwe | ................... | G06F 21/10 717/174 |
| 2008/0235445 A1 | 9/2008 | Kacin | | |
| 2008/0313231 A1 | 12/2008 | Kloba | | |
| 2009/0013210 A1 * | 1/2009 | McIntosh et al. | ................... | 714/4 |
| 2009/0070442 A1 | 3/2009 | Kacin | | |
| 2010/0064299 A1 | 3/2010 | Kacin | | |
| 2010/0250730 A1 * | 9/2010 | Menzies | ................... | G06F 21/105 709/224 |
| 2012/0042168 A1 * | 2/2012 | Yuan | ................... | G06F 21/10 713/176 |
| 2012/0054440 A1 * | 3/2012 | Doig et al. | ................... | 711/122 |
| 2012/0290689 A1 * | 11/2012 | Beguelin et al. | ................... | 709/220 |
| 2012/0329484 A1 * | 12/2012 | Rothschild | ................... | 455/456.5 |

(Continued)

OTHER PUBLICATIONS

Mac Mini, Technical Specifications, www.apple.com, dated Jul. 6, 2011.*

U.S. Appl. No. 13/182,230, filed Jul. 13, 2011, Kacin.

(Continued)

*Primary Examiner* — Rodney Fuller

(74) *Attorney, Agent, or Firm* — Baker Botts L.L.P.

(57) ABSTRACT

In one embodiment, a mini appliance comprises: one or more low-power, low-heat, and low sound processors; one or more memories; and one or more software modules performing one or more system-management functionalities.

20 Claims, 4 Drawing Sheets

(56) References Cited

U.S. PATENT DOCUMENTS

2013/0019316 A1* 1/2013 Kacin .................. G06F 21/10
    726/26
2014/0032449 A1* 1/2014 Kacin ................ H04L 41/0883
    706/12

OTHER PUBLICATIONS

*Dell KACE™ K1000 Management Appliance Datasheet*, http://www.kace.com/pdf/datasheet/KACE-Systems-Management-Appliance.pdf, downloaded Jul. 18, 2011.
*Dell KACE K1000 System Management Appliance, Overview*, http://www.kace.com/products/systems-management-appliance/, downloaded Jul. 18, 2011.
*Dell KACE K1000 System Management Appliance, Features*, http://www.kace.com/products/systems-management-appliance/features.php, downloaded Jul. 18, 2011.
*Dell KACE K1000 System Management Appliance, Tech Specs*, http://www.kace.com/products/systems-management-appliance/tech-specs.php, downloaded Jul. 18, 2011.
*Dell KACE™ K2000 Deployment Appliance Datasheet*, http://www.kace.com/pdf/datasheet/KACE-Systems-Deployment-Appliance.pdf, downloaded Jul. 18, 2011.
*Dell KACE K2000 Deployment Appliance, Overview*, http://www.kace.com/products/systems-deployment-appliance/, downloaded Jul. 18, 2011.
*Dell KACE K2000 Deployment Appliance, Features*, http://www.kace.com/products/systems-deployment-appliance/features.php, downloaded Jul. 18, 2011.
*Dell KACE K2000 Deployment Appliance, Tech Specs*, http://www.kace.com/products/systems-deployment-appliance/tech-specs.php, downloaded Jul. 18, 2011.

* cited by examiner

MINI APPLIANCE

TECHNICAL FIELD

The present disclosure relates generally to computer or network appliances and more specifically to appliances having relatively small sizes.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface (GUI), a networking stack, device drivers, and device management software. In some instances, services may be provided by other application software running on the information handling system, such as a database server.

Some information handling systems are designed to interact with other information handling systems over a computer network connection. In particular, certain information handling systems may be designed to monitor, configure, and adjust the features, functionality, and software of other information handling systems by communicating with those information handling systems over a network connection. For example, one information handling system might be configured to manage the installation and updating of software on several other information handling systems.

In the context of the present disclosure, the term "network appliance" may refer to any device, such as an information handling system, which may include a combination of hardware, firmware, and/or software, that is capable of performing a set of operations or functions in connection with or over a computer network. The actual set of operations or functions a specific network appliance is capable of performing often depends on the hardware, firmware, and/or software included in that appliance. In the very least, however, a network appliance should be capable of being connected to a computer network.

For example, the Dell KACE K1000, a product of Dell Inc., is a network appliance that provides system management on a computer network. Some of the operations supported by the Dell KACE K1000 appliance include device discovery and inventory, patch management, configuration and policy management, organizational management, asset management, power management, software distribution, remote site replication, security audit and enforcement, and administrative alerts. As another example, the Dell KACE K2000, another product of Dell Inc., is a network appliance that provides computer software (e.g., operating systems) deployment over a computer network. Some of the operations supported by the Dell KACE K2000 appliance include disk imaging, device driver management, centralized deployment library, remote site management and remote administration, computer inventory scanning and assessment, network operating system installation, pre and post deployment configuration, user state migration, and system repair and recovery.

SUMMARY

In accordance with the present disclosure, a mini appliance comprises: one or more low-power, low-heat, and low sound processors; one or more memories; and one or more software modules performing one or more system-management functionalities.

The system and method disclosed herein are technically advantageous because they are compact in size, low in cost, easy to use, and highly customizable and configurable. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
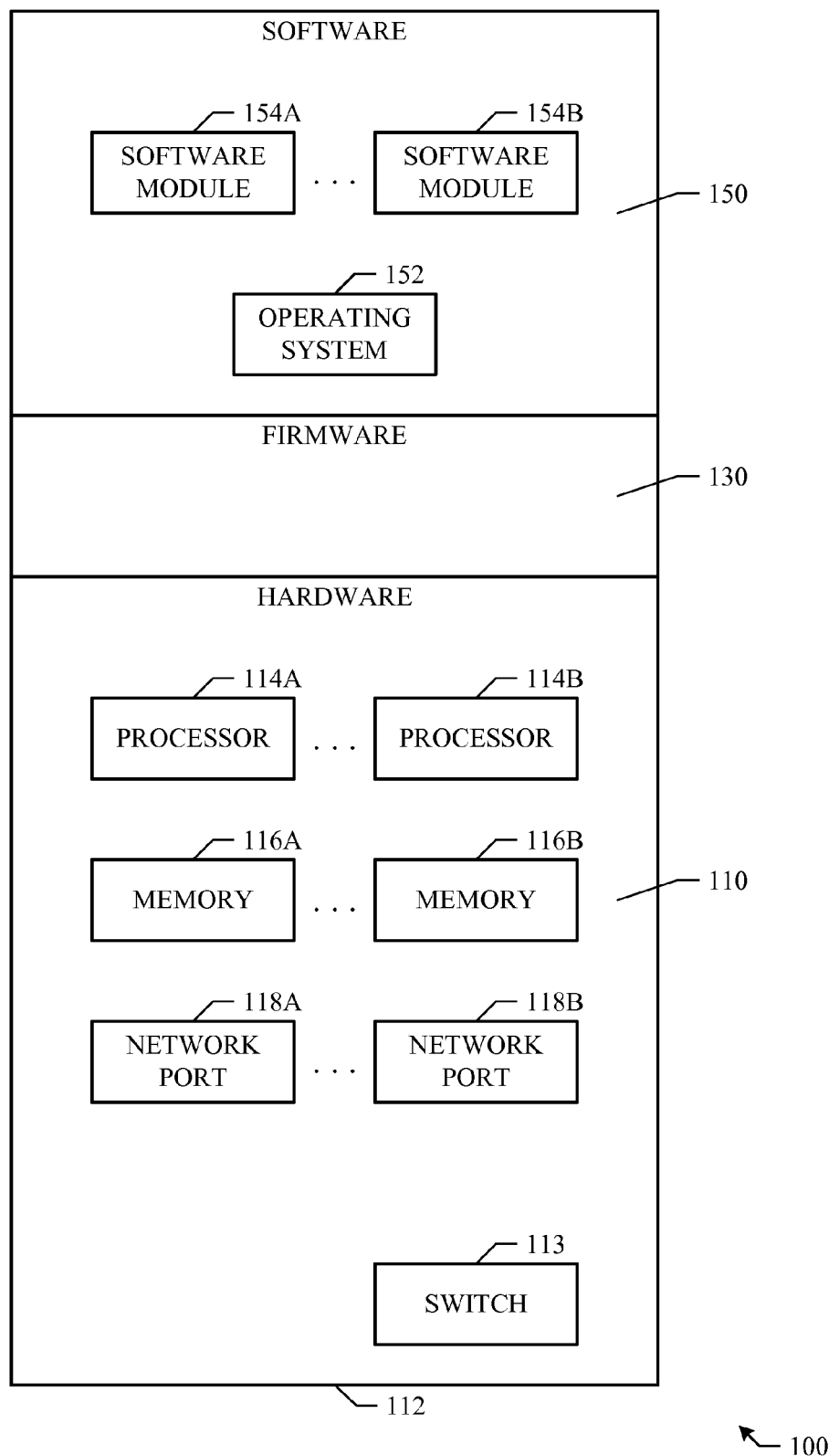
FIG. 1 illustrates an example mini appliance.

Network appliances, such as the Dell KACE K1000 system management appliance and the Dell KACE K2000 software deployment appliance, often support large sets of operations. In order to implement and support such large sets of operations, these appliances may place higher demands on their hardware configurations (e.g., faster processors, larger memories, etc.) and have more complex firmware and/or software that implement the necessary functionalities. As a result, such high-end, comprehensive network appliances often have relatively higher costs. At the same time, because of the large sets of operations provided by these network appliances, it may take some time for their users to be sufficiently trained and to learn all the functionalities supported by the appliances. However, not all users (e.g., companies and individuals) have the same requirements for a network appliance and not all users need a network appliance that performs a large, comprehensive set of operations. For example, a specific user may only need a network appliance that provides one or two functionalities specifically suitable to that user. In this case, it does not make business sense for the user to pay the higher cost to purchase a network appliance that supports many functionalities that the user does not need. In addition, the user may feel somewhat intimidated by network appliances that provide large sets of operations, some of which may be very complicated, and thus require relatively longer learning periods to be sufficiently familiar with the individual operations supported by the network appliances.

Particular embodiments provide mini appliances that support relatively smaller sets of operations. These mini appliances may be customized for individual users, such that a mini appliance only supports the specific functionalities actually needed by a specific user. From a business point of view, the users only pay for what they actually need and use (e.g., in terms of hardware, firmware, and/or software costs), and it may take relatively shorter periods of time for the users to be sufficiently trained to use the mini appliances. From a technical point of view, because each mini appliance only needs to support a relatively few specific functionalities (i.e., each network appliance is dedicated to these specific functionalities), the performance of the appliance may be further optimized. In addition, the demands on hardware may be less strenuous so that there may be more options (e.g., in terms of individual hardware components) and the physical size of each network appliance may be relatively smaller. Some embodiments of the mini appliances may be small form factor machines especially suitable for use in homes or offices. They are low cost and user friendly, consume less power, produce less heat and noise, and may stay powered up at all times. They may be able to function independently, without requiring external support (e.g., they do not need to be connected to a data center).

Mini appliances are designed to reduce the repetitive and time-consuming tasks associated with running an IT (information technology) department, especially at small organizations. Each mini appliance has true "plug and play" operations that enable network administrators to know the exact state of their network devices (e.g., servers and clients), and helps to ensure software license compliance. In addition, network security can be improved by helping network managers identify which assets are improperly configured, and letting them proactively address configuration issues before they become a security problem. Organizations can rely on the mini appliances to continuously monitor their hardware and software, thus giving them the freedom to spend more time on strategic projects and to provide a higher level of service.

FIG. 1 illustrates an example appliance 100. In particular embodiments, appliance 100 includes hardware 110, firmware 130, and software 150. In particular embodiments, hardware 110 may include a housing or chassis 112, which may be constructed from any suitable material (e.g., plastic or metal, such as brushed aluminum). In particular embodiments, chassis 112 is no greater than six inches in length, no greater than six inches in width, and no greater than two inches in height. In particular embodiments, mini appliance 100 weights no more than 2.5 lbs. Because appliance 100 has a relatively smaller size, it may be referred to as a mini appliance. In particular embodiments, various hardware components may be placed inside or coupled to chassis 112.

For example, in one implementation of mini appliance 100, there may a power port (e.g., Direct Current (DC) power input), two Universal Serial Bus (USB) ports (e.g., USB 2.0 or 3.0), an Ethernet port (e.g., 10/100/100 RJ-45 Ethernet), a Kensington lock (providing physical security), a reset button, and a status or reset indicator (e.g., a light-emitting diode (LED)) coupled to chassis 112. A power cable may be plugged into the power port to supply power to mini appliance 100, and a network cable may be plugged into the Ethernet port to connect mini appliance 100 to a network. The power cable may include a converter that converts the power from an alternating current (AC) power source (e.g., 110 V or 220 V) to the power needed by mini appliance 100. In one implementation, mini appliance 100 may require a power supply of 15 W (typical) to 30 W (maximum).

The hardware components included in the mini appliances may be customized for specific users. That is, the hardware components included in one mini appliance may differ from the hardware components included in another mini appliance. For example, different mini appliances may have different types of processors, different amounts of memories, etc., depending on the specific technical requirements for the individual mini appliances.

In particular embodiments, there may be any number of processors 114 inside chassis 112. In particular embodiments, processors 114 may be some type of embedded central processing units (CPU). In particular embodiments, each processor 114 may be a mobile processor. In particular embodiments, each processor 114 is a CPU designed to save power (e.g., low power processor) and produce less heat (e.g., low heat processor) and noise (e.g., low sound processor). For example, in one implementation, each processor 114 may achieve 80% or more power efficiency. Each processor 114 is housed in a relatively smaller chip package, uses lower voltages than standard processors, and has more sleep mode capabilities. For example, in one implementation, each processor 114 may be a processor implementing the ARM (Advanced Reduced Instruction Set Computer (RISC) Machine or Acorn RISC Machine) architecture, which is a 32-bit RISC instruction set architecture (ISA) originally developed by ARM Holdings. In another implementation, each processor 114 may be a duel-core Xeon processor developed by Intel. In a third implementation, each processor 114 may be a high-performance integrated controller developed by Marvell (e.g., Marvell 88F6282 2.0 GHz ARM processor), which integrates the Marvell-developed CPU core, which is ARMv5TE-compliant, with a 256 KB L2 cache. In particular embodiments, processors 114 may execute the code implementing software 150 and firmware 130.

In particular embodiments, there may be any number of memory modules 116 inside chassis 112. In particular embodiments, each memory module 116 may be Random Access Memory (RAM), Read Only Memory (ROM), flash memory, hard disk, or any other suitable non-transitory storage media. For example, each memory module 116 may be solid state memory. In particular embodiments, the code implementing software 150 may be stored in memories 116. For example, in one implementation, mini appliance 100 may include 1 or 2 GB of RAM (e.g., double data rate (DDR) synchronous dynamic random access memory (SDRAM), DDR type 2 SDRAM, or DDR type 3 SDRAM) and a solid state drive of 16 GB. The DDR3 SDRAM may be a part of the motherboard (e.g., soldered on the motherboard).

In particular embodiments, at least one memory module (e.g., memory module 116A) is a non-volatile, non-transitory storage media. In particular embodiments, memory module 116A may be a hard disk, and more specifically, a solid state drive (SSD), which is a data storage device that uses solid-state memory to store persistent data. In particular embodiments, memory module 116A may include a SSD controller that incorporates the electronics that bridge the NAND memory components to mini appliance 100. The SSD controller may be an embedded processor that executes firmware-level code. In particular embodiments, there may be a file system on memory module 116A.

In particular embodiments, at least one memory module (e.g., memory module 116B) is NAND flash memory, which is a non-volatile computer storage chip that can be electrically erased and reprogrammed. NAND flash memory uses floating-gate transistors connected in a way that resembles a NAND gate. In particular embodiments, a complete copy of the boot code for mini appliance 100 is stored in NAND flash memory module 116B. In particular embodiments, appliance 100 includes a build-in DCHP (Dynamic Host Configuration Protocol) server.

In particular embodiments, there may be a power switch 113 coupled to chassis 112. Mini appliance 100 may be turned on or off using switch 113. In particular embodiments, mini appliance 100 may be reset by turning off the power using switch 113. Note that in some implantations, there is no on/off switch included in a mini appliance, only a reset button.

In particular embodiments, there may be any number of network ports 118 coupled to chassis 112. In particular embodiments, each network port 118 may be an Ethernet connection. Mini appliance 100 may be connected to a computer network via one or more of network ports 118. In one example implementation, there may be two Ethernet ports 118 coupled to chassis 112.

In particular embodiments, at least one network port (e.g., network port 118B) has an associated Internet Protocol (IP) address that, once assigned, cannot be changed by users of mini appliance 100. The IP address of network port 118B remains fixed. A user may always access mini appliance 100 by connecting to network port 118B using its associated IP address. In particular embodiments, network port 118B is a dedicated port used for administrative purposes only. The user may reset mini appliance 100 at any time (e.g., when mini appliance 100 experiences problems) through network port 118B.

In particular embodiments, there is no video card and video output port included in hardware 110. Consequently, a display (e.g., a monitor) cannot be connected to mini appliance 100. Instead, when mini appliance 100 is connected to a computer network, a user may access and control mini appliance 100 by using the IP address associated with one of its network ports (e.g., network port 118B). For example, a browser-based user interface may be provided, such that when the user enters the IP address associated with network port 118B in a web browser executing on a computing system also connected to the same computer network, the browser-based user interface may be presented to the user in the web browser. The user may then interact with mini appliance 100 through this user interface (e.g., inputting and sending commands to mini appliance 100, or reviewing current status and setup of mini appliance 100). The browser-based user interface may be designed to be very user friendly so that the user can manage the mini appliance via the user interface intuitively, without the need for extensive training.

In particular embodiments, there is no fan (e.g., cooling fan) inside chassis 112, partly because processors 114 produce little heat. Instead, mini appliance 100 may use natural convection technology for cooling purpose. Natural convection, in general, is a mechanism or type of heat transport, in which the fluid motion is not generated by any external source (e.g., pump, fan, suction device, etc.) but only by density differences in the fluid occurring due to temperature gradients. In addition, in particular embodiments, there is no hardware component included in mini appliance 100 that physically moves while mini appliance 100 is in operation. For example, there is no hard drive or cooling fan that spins while mini appliance 100 is in operation.

In particular embodiments, software 150 may include an operating system 152 and any number of software modules 154. In one implementation, operating system 152 may be a Linux-based operating system (e.g., Debian 6 Operating System). Operating system 152 may include a kernel (e.g., a Linux kernel), which provides a bridge between software modules 154 and the actual operations (e.g., data processing) performed at the hardware level (i.e., with hardware 110). Operating system 152 may also include any number of software libraries, which implement and provide various functionalities (e.g., utility functions) that may be used by software modules 154. In particular embodiments, each software module may implement specific functionalities supported by mini appliance 100. Some of these functionalities are described in more detail below.

In particular embodiments, each specific mini appliance may include one or more software modules implementing one or more specific functionalities, some of which are described in more detail below. The software modules included in one mini appliance may differ from the software modules included in another mini appliance. Consequently, one mini appliance may support specific operations different from those supported by another mini appliance. By selectively installing different software modules on different mini appliances, the operations supported by each mini appliance may be customized for specific users.

For example, one type of mini appliances may be referred to as "inventory and compliance" mini appliance. The main operations supported by an inventory and compliance mini appliance are two folds. First, for the "inventory" part, the inventory and compliance mini appliance may collect information about a computer network through the use of agents. In particular embodiments, each agent is a piece of computer software executing on a specific computing device connected to the network. Each computing device connected to the network may have its own agent executing on it. Each agent may collect information about the computing device on which it resides, such as the hardware components of the computing device, the hardware status of the computing device at a given time (e.g., CPU usage, amount of memory available, etc.), the operating system of the computing device, the software applications installed on the computing device, the applications or programs running on the computing device at a given time, which users use the computing device at a given time, etc. The specific types of information collected by each agent may be customized for specific users. Each agent may send all the information collected about its computing device to a server, and the server may store the information received from all the agents. In particular embodiments, there may be a browser-based user interface provided with the server that enables a user (e.g., a network administrator) to review the information collected by the agents about the network. Second, for the "compliance" part, based on the information collected, the inventory and compliance mini appliance may determine whether the various license agreements are observed and satisfied, and alert a user (e.g., a network administrator) if there are any software license compliance issues. For example, if there are 15 copies of license of a software application available and yet, there are 20 copies of that software application installed and running on various computing devices connected to the network, the inventory and compliance mini appliance may alert the network administrator that there are more copies of the software application installed throughout the network than the number of copies of license available for the software application, and thus the system is not in compliance with the software license.

In one implementation, a mini appliance may include software modules that implement various system management functionalities, which may be especially suitable to small businesses and homes. Examples of different types of mini appliances may include, without limitation, Asset Management Appliance, Super Disk Controller, Help Desk Appliance, and Patch Appliance. They may perform system-management functionalities and provide appliance-based solutions such as, for example and without limitation automated filters and search, compliance monitoring, easy-to-digest inventory, system management, information technology (IT) automation, system deployment, software patching, software inventory and license compliance, end-point device security, end-user data backup, file movement, scripting, and home network or computing.

Figure 2:
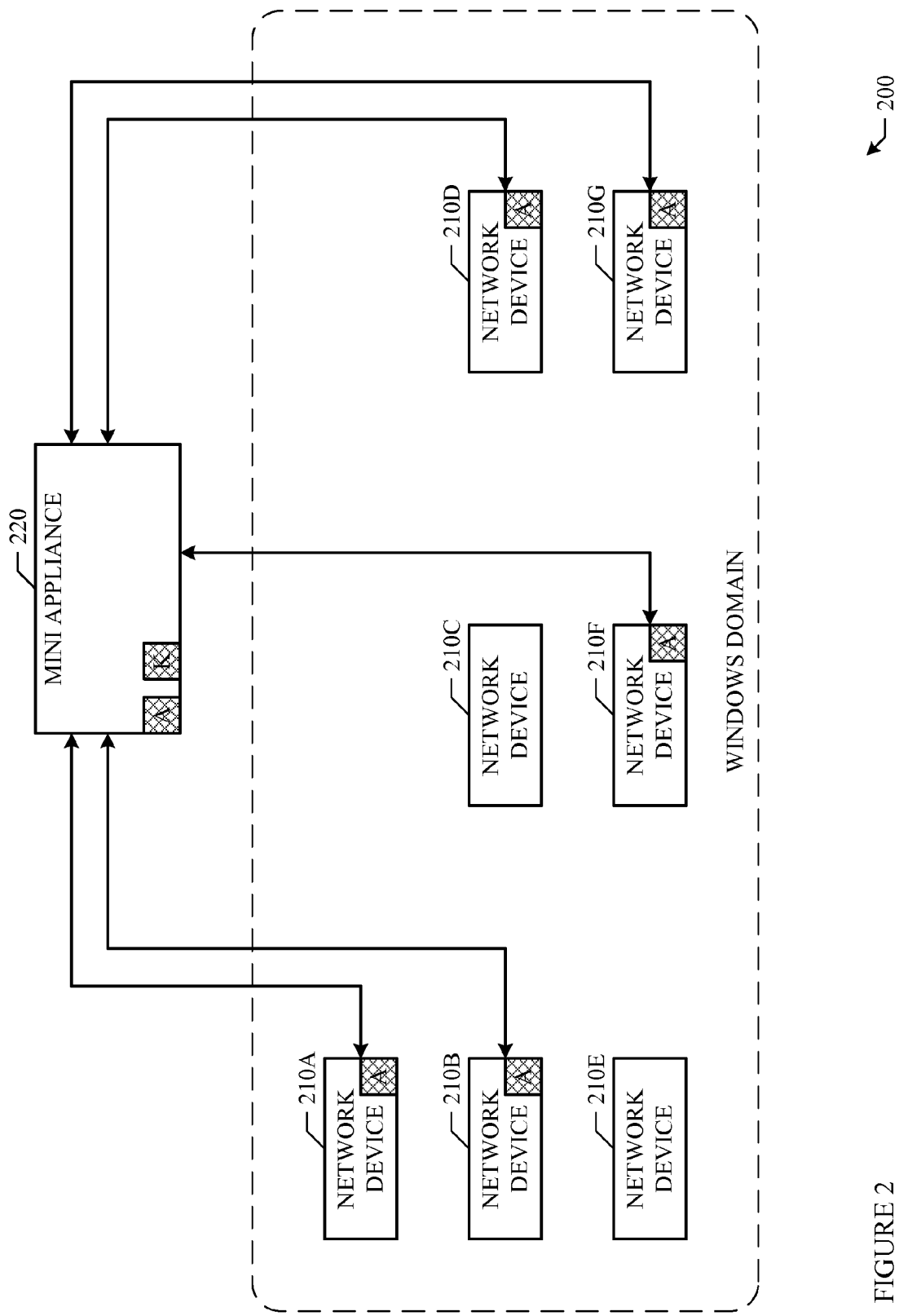
FIG. 2 illustrates an example network with an example mini appliance connected to it.

In particular embodiments, a mini appliance, such as the one illustrated in FIG. 1, is intended to be connected to a computer network to perform various operations in connection with the network. FIG. 2 illustrates an example network 200 with an example mini appliance 220 connected to it (e.g., via an Ethernet connection). In addition, network 200 may include any number of other network devices 210A-210G, such as various types of servers (e.g., application servers, web servers, file servers, database servers, mail servers, etc.) and clients (e.g., desktop computers, notebook computers, mobile devices, etc.), which may be connected to network 200 via wired or wireless connections. In particular embodiments, each network device 210 is connected to mini appliance 220 through a persistent connection.

In particular embodiments, network 200 may be an intranet, an extranet, a virtual private network (VPN), a local area network (LAN), a wireless LAN (WLAN), a wide area network (WAN), a metropolitan area network (MAN), a portion of the Internet, or another network 200 or a combination of two or more such networks 200. This disclosure contemplates any suitable network 200.

In particular embodiments, each network device 210 may be a unitary device or may be a distributed device spanning multiple computing devices or multiple datacenters. Each network device 210 may include hardware, software, or embedded logic components or a combination of two or more such components for carrying out the appropriate functionalities implemented or supported by network device 210. A network device 210 may have a web browser, such as MICROSOFT INTERNET EXPLORER, GOOGLE CHROME, or MOZILLA FIREFOX, and may have one or more add-ons, plug-ins, or other extensions, such as GOOGLE TOOLBAR or YAHOO TOOLBAR. A user at network device 210 may enter a Uniform Resource Locator (URL) or other address directing the web browser to another network device 210 or to mini appliance 220 or to a device on the Internet, and the web browser may generate a Hyper Text Transfer Protocol (HTTP) request and communicate the HTTP request to another device (e.g., mini appliance 220).

Mini appliance 220 may accept the HTTP request and communicate to network device 210 one or more Hyper Text Markup Language (HTML) files responsive to the HTTP request. Network device 210 may render a web page based on the HTML files from mini appliance 220 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate. In particular embodiments, a web-based user interface provided by mini appliance 220 for managing mini appliance 220 may be accessed in the web browser executing on a network device 210 in such a manner.

In one implementation, to configure a mini appliance, the mini appliance may be connected to a computing device (e.g., a desktop or notebook computer) via an Ethernet cable (e.g., one end of the Ethernet cable is plugged into the Ethernet port provided on the mini appliance and the other end of the Ethernet cable is plugged into an Ethernet port provided on the computing device). The mini appliance may be powered on by connecting a power cord to the power inlet on the mini appliance and a power source (e.g., an AC power outlet). When the status LED indicator becomes solid, the mini appliance is ready to be configured. A web-based user interface is provided for configuring the mini appliance. The user interface may be accessed via a web browser executing on the computing device by inputting the URL provided with the mini appliance (e.g., the IP address of the mini appliance) in the web browser. There are instructions directing the user on how to set up an administrator account and configure the mini appliance.

For example, once a mini appliance has been powered up and connected to a computer, a user may open a web browser on the computer and go to the IP address provided with the mini appliance (e.g., "http://192.168.2.100"). Thereafter, a Configuration Wizard may guide the user through the following steps: (1) agree to the End User License Agreement; (2) setup the Administrator Account, where the user may select login ID, password, and security questions and answers; (3) time-zone setup; and (4) network settings, where the user may specific hostname, domain name, IP address, default gateway, primary DNS, and secondary DNS for the mini appliance.

After configuration, to connect the mini appliance to a network, the mini appliance may be connected to a network hub (e.g., a router) on the network via an Ethernet cable (e.g., one end of the Ethernet cable is plugged into the Ethernet port provided on the mini appliance and the other end of the Ethernet cable is plugged into an Ethernet port provided on the network hub). The mini appliance may be powered on by connecting a power cord to the power inlet on the mini appliance and a power source (e.g., an AC power outlet). When the status LED indicator becomes solid, the mini appliance is ready.

Network Discovery and Agent Deployment

In particular embodiments, mini appliance 220 has a Linux-based operating system (i.e., mini appliance 220 is a Linux-based device), whereas each network device 210 has a Microsoft-Windows-based operating system (i.e., each network device 210 is a Windows-based device). Thus, network devices 210A-210G all belong to the Windows domain, whereas mini appliance 220 is outside of the Windows domain. That is, mini appliance 220 is not connected to the Windows domain. Within the Windows domain, the devices connected to the Windows domain are generally aware of all the devices (e.g., network devices 210A-210G) within the Windows domain. When mini appliance 220 is first connected to network 200, because it is outside of the Windows domain, it needs to discover information about network 200, such as the topology of network 200, the specific devices that are connected to network 200, etc.

One purpose for mini appliance 220 to discovery what specific devices are connected to network 200 is for deploying and installing copies of an agent associated with mini appliance 220 to at least some of these devices connected to network 200. In particular embodiments, the agent, also referred to as Asset Management Agent in some cases, is a piece of software that may execute on a network device 210 for monitoring and collecting information about that network device 210. In particular embodiments, mini appliance 220 has a copy of the agent together with its installation script, which may be used to install copies of the agent on the individual network devices 210.

There are different ways for mini network application 220 to discover what specific devices are connected to network 200. In particular embodiments, one of network devices 210 (e.g., network device 210A) may be a discovery device used by a network administrator. Discovery device 210A may help mini appliance 220 discover the individual devices on network 200 and deploy copies of the agent to at least some of these devices. In particular embodiments, discovery device 210A may function similarly as a bastion host. In general, a bastion host is a special purpose computer on a network specifically designed and configured to withstand attacks. The computer generally hosts a single application (e.g., a proxy server), and all other services are removed or limited to reduce the threat to the computer. It is hardened in this manner primarily due to its location and purpose, which is either on the outside of the firewall or in the demilitarized zone (DMZ) and usually involves access from un-trusted networks or computers. In particular embodiments, the network administrator may manually install a copy of the agent on discovery device 210A. The agent executing on discovery device 210A may establish and maintain a persistent connection between discovery device 210A and mini appliance 220.

In particular embodiments, mini appliance 220 may request discovery device 210A, through the copy of the agent executing on discovery device 210A, to discover all the devices (e.g., network devices 220B-220G) connected to network 200. Because discovery device 210A is within the Windows domain, it is able to discover all the devices within the Windows domain. Discovery device 210A may inform mini appliance 220, through the copy of the agent executing on discovery device 210A, all the devices (e.g., network devices 210B-210G) currently connected to network 200. Mini appliance 220 may present a list of all the devices currently connected to network 200 to the network administrator through, for example, a web-based interface, so that the network administrator may select, from the list, the specific devices to which copies of the agent should be deployed. For example, suppose that the network administrator selects network devices 210B, 210D, 210F, 210G. Mini appliance 220 may request discovery device 210A, again through the copy of the agent executing on discovery device 210A, to deploy a copy of the agent to each of network devices 210B, 210D, 210F, 210G. Once a copy of the agent is installed and executed on each of network devices 210B, 210D, 210F, 210G, the agent may establish and maintain a persistent connection between each of network devices 210B, 210D, 210F, 210G and mini appliance 220. Note that in particular embodiments, since copies of the agent are not deployed to and installed on network devices 210C, 210E, there are no persistent connections between network devices 210C, 210E and mini appliance 220.

In particular embodiments, a Deployment Server (e.g., one of network devices 210) may be employed to distribute copies of the agent. The Deployment Server is responsible for determining which devices are connected to network 200 and whether those devices each have a copy of the agent installed thereon. In addition, if a network device 210 does not have a copy of the agent installed thereon, the Deployment Server is responsible for installing a copy of the agent on that device. In one implementation, the Deployment Server may be manually selected (e.g., by a network administrator). A copy of the agent may be downloaded from mini appliance 220 to one of network devices 210 that is to function as the Deployment Server, and installed on the Deployment Server. By default, mini appliance 220 assigns the first device having a copy of the agent as the Deployment Server, but any device with a copy of the agent may be designated (e.g., by a network administrator) as the Deployment Server. In addition, the Deployment Server may be changed to another device 210 at any time (e.g., via the user interface provided with mini appliance 220).

The Deployment Server then queries network 200 for other network devices 210 and reports the information to mini appliance 220. In particular embodiments, the Deployment Server may continue query network 200 looking for new devices from time to time (e.g., every 6 hours) and report the updated information to mini appliance 220 as it becomes available.

Alternatively, in particular embodiments, mini appliance 220 may discover what devices are connected to network 200 itself, using a slow and random scan of network 200, so that the scanning of network 200 performed by mini appliance 220 does not interfere with network traffic and is not stopped by the security mechanism of network 200. In particular embodiments, the scanning of network 200 may use a combination of simple network management protocol (SNMP) scanning and ping scanning More specifically, mini appliance 220 may ping each IP address within the address range of network 200 to see whether a specific IP address is alive (e.g., is associated with a network device). The ping may be done randomly with respect to the IP addresses (i.e., the IP addresses are pinged randomly, not in sequence). If a specific IP address is alive, mini appliance 220 may perform a deeper scan of the IP address using SNMP scanning to obtain more information about the network device having the IP address.

In particular embodiments, after mini appliance 220 discovers the individual network devices connected to network 200, again, mini appliance 220 may present a list of all the devices currently connected to network 200 to the network administrator so that the network administrator may select, from the list, the specific devices to which copies of the agent should be deployed. In some implementations, mini appliance 220 may maintain an Inventory list that contains all network devices 210 discovered on network 200. In addition, mini appliance 220 may keep track of which network devices 210 has a copy of the agent installed thereon and which does not. Thus, when presenting a list of network devices 210 currently connected to network 200 to the network administrator, those devices 210 that already have copies of the agent may be visually distinguished from those devices 210 that do not yet have copies of the agent installed (e.g., an icon representing the agent may be displayed next to each device 210 that already has a copy of the agent installed thereon). Mini appliance 220 thus is able to track the inventory (e.g., network devices 220 and their status) for network 200.

In particular embodiments, for a device 210 that does not yet have a copy of the agent installed thereon, The Deployment Server may install a copy of the agent on that device 210. In some implementations, by default, the Deployment Server installs a copy of the agent on a device 210 with the same configuration as its own copy of the agent (e.g., including mini appliance 220 server name and other agent parameters based on the credentials supplied by the network administrator).

In particular embodiments, the copy of the agent executes on each of network devices 210B, 210D, 210F, 210G may monitor and collect informational about each of network devices 210B, 210D, 210F, 210G and transmit the collected information to mini appliance 220. Mini appliance may store and processes the information about network devices 210B, 210D, 210F, 210G as needed.

In particular embodiments, the copy of the agent executing on each of network devices 210A, 210B, 210D, 210F, 210G communicates with mini appliance 220 using asynchronous messaging protocol (AMP), which is a communications protocol for sending multiple asynchronous request/response pairs over the same connection. Requests and responses are both collections of key/value pairs. The copy of the agent executing on each of network devices 210A, 210B, 210D, 210F, 210G listens for and receives commands from mini appliance 220 and performs operations as directed by mini appliance 220. Thus, in particular embodiments, the copies of the agent on network devices 210A, 210B, 210D, 210F, 210G are continuously executed while network devices 210A, 210B, 210D, 210F, 210G are powered on and running.

In particular embodiments, the specific commands sent to each copy of the agent may be implemented as plug-ins to the agent. Different commands may be sent to different copies of the agent executing on different network devices as different plug-ins. Consequently, each copy of the agent may be customized to perform different operations depending on the specific network device on which it resides and executes. For example, one command may be for collecting inventory information. The copy of the agent on a network device may be directed to collect monitor and information such as the specific software applications installed and executed on that network device, the number of users using each software application, etc.

In particular embodiments, the agent is a single-thread process. It performs one command (i.e., one task) at a time.

Scheduling and Performance

In particular embodiments, there may be a software module, referred to as the "konductor", residing and executing on mini appliance 220. In particular embodiments, the konductor maintains a list of tasks (e.g., as a queue) that needs to be performed by the copies of the agent executing on the network devices (e.g., network devices 210A, 210B, 210D, 210F, 210G) connected to mini appliance 220. The konductor may assign specific tasks to each copy of the agent when needed so that the copy of the agent may perform these tasks accordingly.

In particular embodiments, when the konductor assigns tasks to each copy of the agent, the konductor may consider how busy mini appliance 220 and network 200 currently are to balance the work load for mini appliance 220. The konductor may analyze various relevant factors to determine how busy mini appliance 220 or network 200 is, such as, for example and without limitation, the CPU or memory usage of mini appliance 220, the number of tasks being performed concurrently by mini appliance 220, the number of tasks in the task queue, the traffic load and available bandwidth of network 200, etc. For example, when mini appliance 220 is not too busy, the konductor may increase the number of tasks sent to the copies of the agent executing on network devices 210A, 210B, 210D, 210F, 210G to be performed. Conversely, when mini appliance 220 is very busy, the konductor may decrease the number of tasks sent to the copies of the agent executing on network devices 210A, 210B, 210D, 210F, 210G to be performed. If there is no task currently in the queue to be sent out, the konductor may go into a standby mode for some period of time.

In particular embodiments, there may be a feedback mechanism that enables the konductor to determine how busy mini appliance 220 is at a given time. The feedback mechanism may take into consideration relevant information such as, for example and without limitation, the CPU or memory usage of mini appliance 220, the number of tasks being performed concurrently by mini appliance 220, the number of tasks in the task queue, the traffic load and available bandwidth of network 200, etc. at a given time to determine how busy mini appliance 220 is at that time, and respond accordingly.

Error Detection and Hardware Reset

As indicated above, in particular embodiments, there is no video output included in the hardware of a mini appliance. Thus, a keyboard, mouse, or monitor cannot be connected to the mini appliance that enable a user (e.g., a network administrator) to interact with the mini appliance (e.g., change various settings of the mini appliance). In particular embodiments, a web-based interface may be provided that enables a user to interact with the mini appliance via a web browser executing on another network device by, for example, accessing the IP address of the mini appliance through the web browser. The user may input the IP address of the mini appliance into the web browser to establish a network connection (e.g., a hypertext transfer protocol (HTTP) connection) to the mini appliance. A web-based interface may be presented to the user in the web browser. The user may change various settings of the mini appliance through the web-based interface.

If there are errors in the settings of a mini appliance, especially if there is a problem with the IP address of the mini appliance (e.g., the IP address of the mini appliance is corrupted or wrong), the user may not be able to connect to the mini appliance through its erroneous IP address to resolve the problems and reset the mini appliance. In particular embodiments, the user may need to reset the mini appliance by either shutting down the mini appliance using the power switch (e.g., switch 113 of mini appliance 100 illustrated in FIG. 1) or pushing the reset button if one is provided. In particular embodiments, shutting down a mini appliance may reset all settings of the mini appliance to their default values and the database to the original factory state.

However, shutting down a mini appliance may result in all customer settings being lost, which may not be desirable under some circumstances. In particular embodiments, as described above, there are at least two network ports provided with a mini appliance (e.g., network ports 118A and 118B of mini appliance 100 illustrated in FIG. 1). Each network port has its own IP address. Generally, a user accesses and interacts with the mini appliance through one network port (e.g., network 118A illustrated in FIG. 1) using the IP address of this first network port. If the IP address of the first network port is corrupted due to any reason, the user may still access and interact with the mini appliance through the other network port (e.g., network 118B illustrated in FIG. 1) using the IP address of this second network port. In particular embodiments, the IP address of the first network port (e.g., network 118A illustrated in FIG. 1) may be changed by the user through the web-based interface, whereas the IP address of the second network port (e.g., network 118B illustrated in FIG. 1), once set, may not be changed by the user. For example, the web-based interface does not provide any means for the user to change the IP address of the second network port. In particular embodiments, the second network port is dedicated for error recovery purposes, and enables a user to reset the mini appliance under any circumstances, especially when the mini appliance has specific settings that need to be fixed individually.

Failure or Error Recovery

Figure 3:
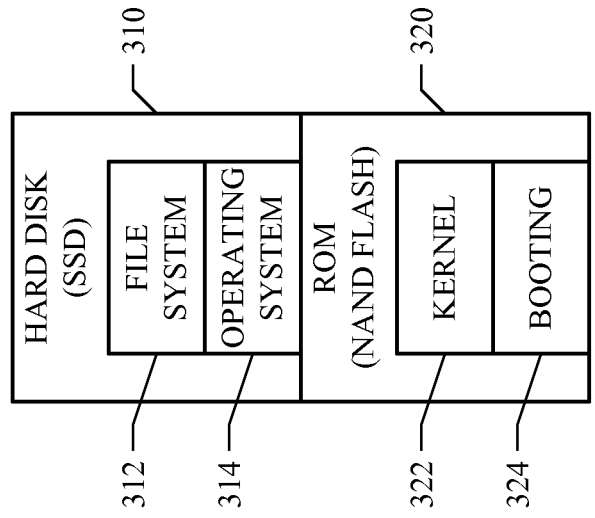
FIG. 3 illustrates an example memory configuration of a mini appliance.

As indicated above, the hardware of a mini appliance may include any number of memory modules (e.g., memory modules 116A and 116B of mini appliance 100 illustrated in FIG. 1). These memory modules provide various types of storage. FIG. 3 illustrates an example memory configuration of a mini appliance. In particular embodiments, a mini appliance has certain amount of read only memory (ROM) 320 and a hard disk 310. In particular embodiments, ROM 320 may be NAND Flash memory, and the hard disk may be a solid state disk (SSD). In particular embodiments, the mini appliance has a Linux-based operating system. Booting code 324 and kernel 322 of the Linux-based operating system are stored in ROM 320, and Linux-based operating system 314 and a file system 312 are stored on hard disk 310. In particular embodiments, Booting code 324 includes a bootloader, called U-boot, which is an open source bootloader for Linux running on embedded systems.

During the booting process of the mini appliance, booting code 324 is loaded first, followed by kernel 322, followed by operating system 314, and followed by filed system 312. In order for the mini appliance to boot up correctly, at least booting code 324 and kernel 322 must be perfectly correct. However, it is possible for any of booting code 324, kernel 322, operating system 314, and file system 312 to be corrupted. When this happens, the mini appliance cannot be booted up successfully. Particular embodiments provide some means to recover from some of these memory failures.

If any part of kernel 322 is corrupted, particular embodiments may provide some means to recover the kernel. In particular embodiments, booting code 324 may be able to detect whether there is any problem with kernel 322 stored in ROM 320, since booting code 324 is loaded before kernel 322. In particular embodiments, a copy of the kernel may be stored on hard disk 310. In particular embodiments, the copy of the kernel may be stored in a special recovery section on hard disk 310. If kernel 322 in ROM 320 is corrupted in any way, during booting of the mini appliance, kernel 322 is ignored (i.e., not loaded). Instead, after loading booting code 324, the process attempts to access (i.e., boot) the recovery section of hard disk 310 to retrieve the copy of the kernel stored therein and copy the kernel back into ROM 320. Once an uncorrupted copy of the kernel is copied back into ROM 320 as kernel 322, kernel 322 may be loaded normally.

File system 312 may also be corrupted. For example, file system 312 may fail completely such that it is not accessible at all. Or, file system 312 may fail partially such that some of the data stored therein are lost. If any part of file system 312 is corrupted, particular embodiments may provide some means to recover the file system. In particular embodiments, a copy of file system 312 may be stored in ROM 320 (e.g., in NAND flash). In particular embodiments, the copy of file system 312 stored in ROM 320 is compressed. If file system 312 is corrupted in any way, during the booting of the mini appliance, the process accesses the copy of file system 312 stored in ROM 320 and copies the file system back onto hard disk 310 by reimaging the file system. Alternatively or in addition, in particular embodiments, a copy of file system 312 may be stored on a server accessible to the mini appliance (e.g., in a data cloud). If file system 312 is corrupted in any way, during the booting of mini appliance, the process may access the server and download the copy of the file system from the server and reimage the file system back onto hard 310.

Software License Compliance

As described above, there may be a copy of the agent provided by a mini appliance residing and executing on each network device connected to the mini appliance for collecting information about that network device (e.g., as illustrated in FIG. 2). This agent may be referred to as the "inventory" agent, and may collect and report hardware details and provide a list of software (including the operating system) installed on the corresponding device. The collected information may be transmitted to the mini appliance for storage, processing, and analysis. One way to use the collected information is to ensure software license compliance for the computer network. For example, each agent may collect information indicating which software application is installed and executed on a corresponding network device and information describing that software application (e.g., title, version, release date, manufacture, current license status, etc.).

Figure 4:
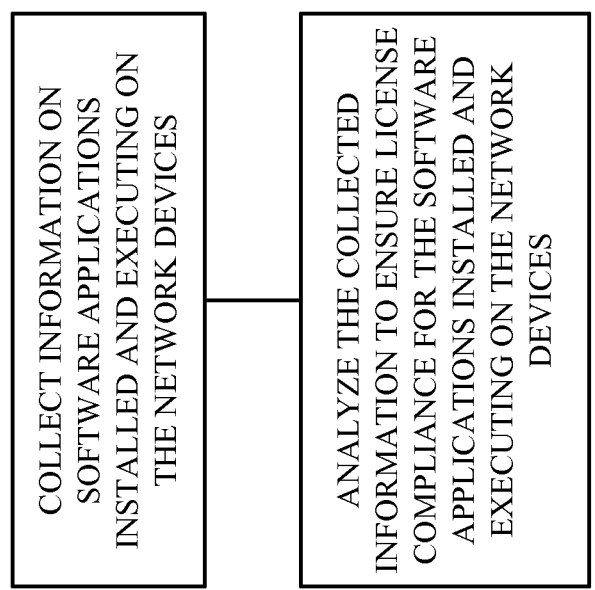
FIG. 4 illustrates an example method for ensuring software license compliance.

Such information may be used to ensure software license compliance among the network devices. For example, the mini appliance may analyze the collected information received from the agents executing on the network devices to ensure license compliance for the software applications installed and executing on these network devices. This process is summarized in FIG. 4. There may be several compliance models provided with a mini appliance.

In particular embodiments, the first compliance model may be referred to as the "counting model". For example, if there are five copies of the license for a software application available for a computer network, then there should be no more than five copies of the software application installed and executing on the network devices in the network. The information collected by the copies of the inventory agent executing on the network devices may be analyzed to determine how many copies of the software application are installed and executing on the network devices in total. If the number of copies of the software application installed and executing on the network devices is more than the number of copies of the license for the software application available, then the network administrator may be notified that the network fails to comply with the license agreement for the software application. The counting model thus compares the total number of copies of a software application installed and executing on the network devices in a network with the total number of copies of the license for the software application available for the network. If the former number is greater than the latter number, then the network does not comply with the license agreement for the software application.

Often, a software application may have many versions. When copies of the software application are installed on the individual network devices, some network devices may have one version of the software application while other network devices may have another version of the software application. On the other hand, the license for the software application is usually for the application itself, not for specific versions of the application. Thus, when determining the total number of copies of the software application installed and executing on the network devices in a network, particular embodiments may take into account all different versions of the application installed on the network devices. To do so, particular embodiments may group the software applications found on the individual network devices, such that different versions of the same application are grouped together. In particular embodiments, the grouping of the software applications may be based on various factors, such as, for example and without limitation, the title, manufacture, version, and installation date of each application. For example, when comparing two application titles, particular embodiments may compute the text distance between the two titles, and if the distance is smaller than a threshold, then the two titles are considered the same. Particular embodiments may present the groups of the software applications to a network administrator, and enable the network administrator to adjust the grouping, when necessary, and provide feedbacks through, for example, a web-based interface. The feedback provided by the network administrator may be used in future grouping of the software applications. Particular embodiments may enable the network administrator to define specific application groups and associate various criteria with each group. Software applications that satisfy the criteria of a specific group are assigned to that group.

Sometimes, a software suite may include any number of individual applications. For example, Microsoft Office includes Word, Excel, Outlook, Power Point, Access, and Publisher. Yet, the license is for the software suite, not for the individual applications included in the suite. Thus, when determining the total number of copies of the software suite installed on the network devices in a network, particular embodiments may examine the individual applications in the software suite that are installed on the network devices. To do so, particular embodiments may group the software applications found on the individual network devices, such that the applications in the same software suite are grouped together.

In particular embodiments, the second compliance model may be referred to as the "authorization model". Given a software application, a network administrator may be presented with a list of the network devices in a computer network, from which the network administrator may indicate to a mini appliance which specific network devices are authorized to have a copy of the software application, using, for example a web-based interface provided with the mini appliance. Thereafter, the information collected by the copies of the inventory agent executing on the network devices connected to the mini appliance may be analyzed to determine if any network devices not authorized to have copies of the software application actually have copies of the software application installed thereon. If so, then the network does not comply with the license agreement for the software application, and the network administrator may be notified, including the identities of the unauthorized network devices that do have a copy of the software application installed.

In particular embodiments, the third compliance model may be referred to as the "license key model". Given a software application with a number of copies of the license, a network administrator may indicate to a mini appliance which specific network device is assigned which specific license key of the software application, using, for example a web-based interface provided with the mini appliance. Thereafter, the information collected by the copies of the agent of the mini appliance executing on the network devices connected to the mini appliance may be analyzed to determine if any network devices not authorized to have license keys of the software application actually have copies of the software application installed thereon or if any network device authorized to have one license key actually has another license key. If so, then the network does not comply with the license agreement for the software application, and the network administrator may be notified, including the identities of the network devices that causes the license compliance problems.

In particular embodiments, a mini appliance may support all available compliance models, and a network administrator may select which model to use for managing software compliance throughout a network. In addition, the user may select specific pieces of software to be managed for license compliance. In particular embodiments, when a piece of managed software installed on one or more computer systems becomes out-of-compliance or the license of the software expires, a notification is posted in the user interface provided by the mini appliance or sent to the user. In addition, the mini appliance may generate a compliance report for all managed software installed throughout the network.

Software Patching

Often, there may be different versions of a piece of software (e.g., operating system or software applications). A new version of a piece of software may include updates, bug fixes, or new features. Sometimes, a new version of a piece of software is referred to as a "patch", and the process of updating the software to the new version is referred to as "patching". In particular embodiments, a mini appliance supports patch management (e.g., updating the software installed on the network devices managed by the mini appliance to new versions).

In particular embodiments, a mini appliance enables its users to configure and control how and when the software installed on the network devices under its management is updated (i.e., patched). For example, a user may choose which piece of software to update or which patches to download and install (e.g., the user may choose to download only the operating system and application patches relevant to his network, thus eliminating the need to manage patches that are not applicable). Different network devices may have different schedules for vulnerability assessment and patching, and some network devices may have higher priority than others (e.g., critical network devices may have their software updated without delay). The mini appliance may offer intuitive search capabilities and views that allow its users to quickly filter through large numbers of patches and easily track patch deployment status.

In particular embodiments, once the user has configured the patch management functionality with a mini appliance, the mini appliance may perform patching automatically (e.g., based on a predefined schedule) or upon receiving a single command from the user (e.g., a click of a button that causes patching to be performed—one-click patching).

In particular embodiments, the mini appliance may help its users coordinate patching updates across complex and distributed user bases and network devices. Through a web-based user interface, a user may control scheduling of the patches with the ability to set up patch windows with hard stops to ensure no interruption for users of the network devices during normal business hours. A summary on patch management and deployment progress and status may be presented to a user, which allows the user to quickly confirm that patches have rolled out successfully and that systems are in compliance, and identify and remediate those systems where patching has failed.

Help Desk

In particular embodiments, a mini appliance supports a "help desk" feature, which provides help to its users on various technical issues. For example, the mini appliance may help its users identify technical problems in a manageable way, effectively automating IT management. Example functionalities related to the help desk feature may include, without limitation, trouble ticket submission, problem tracking and management integrated with the mini appliance knowledge base, hardware and software inventory, remote control, and customizable reporting.

Localization

In particular embodiments, a mini appliance supports localization of various languages (e.g., French, German, Italian, Chinese, etc.). The web-based interface that enables a user to interact with the mini appliance may be customized for different languages. There may be different versions of the mini appliance, each certified by a different country (e.g., environmental certification).

Reporting

In particular embodiments, a mini appliance may report various types of information, such as, for example and without limitation, software-compliance status, network status, agent deployment status, performance status, errors, etc., to its users (e.g., network administrators). The mini appliance may report the information in several ways. As one example, the mini appliance may provide a user interface, referred to as the Dashboard, which displays the appropriate information. The user may log onto the mini appliance to view the Dashboard and the information presented therein. As another example, the mini appliance may send the information using RSS feeds so that the user may receive information without actually logging onto the mini appliance. The user may subscribe to the RSS feeds by logging onto the mini appliance and follow the instructions provided by the mini appliance. The user may subscribe to all notifications or specific categories of notifications.

Computer System

Figure 5:
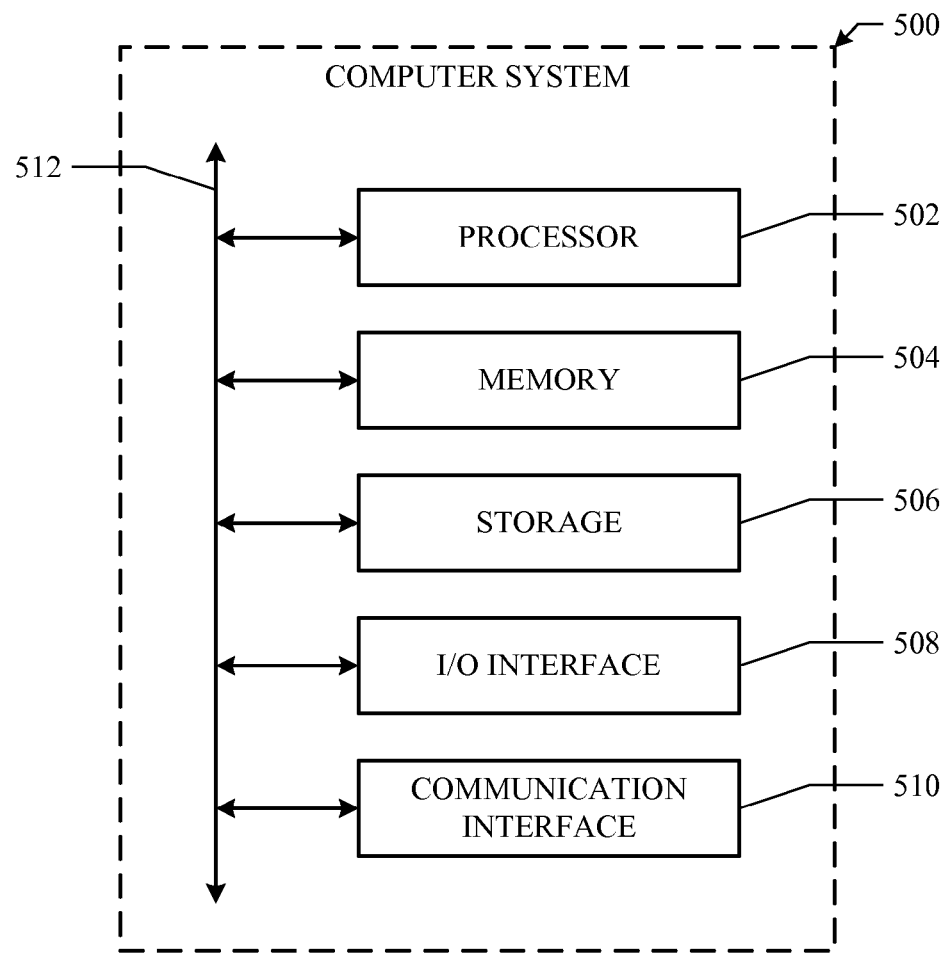
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Although the present disclosure has been described in detail, it should be understood that various changes, substitutions, and alterations can be made hereto without departing from the spirit and the scope of the invention as defined by the appended claims.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

deploying, by a network appliance in a first network domain, a first copy of a first agent to a discovery device in a second network domain, wherein the first network domain and the second network domain are distinct;

establishing a first persistent connection between the network appliance and the discovery device;

sending a discovery request via the first agent to the first copy of the first agent to the discovery device, wherein the network appliance sends the discovery request via the first agent, and wherein the discovery request comprises a request to the discovery device to discover one or more computing devices in the second network domain;

receiving, at the network appliance, information related to the discovered one or more computing devices in the second network domain;

sending a deployment request to the discovery device via the first agent to the first copy of the first agent to deploy a second copy of the first agent to at least one of the one or more computing devices;

deploying a second copy of the first agent to at least one of the discovered one or more computing devices, wherein the deploying is based, at least in part, on the at least one of the discovered one or more computing devices including a copy of the first agent;

establishing a second persistent connection between the network appliance and the at least one of the discovered one or more computing devices;

distinguishing visually to a web-based interface the discovered one or more computing devices with the second copy of the first agent deployed from the discovered one or more computing devices without any copy of the first agent deployed; and sending one or more commands by the network appliance via the first agent to the second copy of the first agent to the at least one of the discovered one or more computing devices.

2. The method of claim 1, wherein the second copy of the first agent is deployed to the at least one of the discovered one or more computing devices by at least one of the network appliance or a deployment server, wherein the deployment server is connected to the network appliance, and wherein the deployment server deploys the second copy of the first agent in response to a deployment request from the network appliance.

3. The method of claim 1, wherein the second copy of the first agent is deployed by a deployment server, and wherein the deployment server is the discovery device.

4. The method of claim 1, wherein the second copy of the first agent is deployed by a deployment server, wherein the deployment server is a second computing device, and wherein the second computing device includes a third copy of the first agent and is persistently connected to the network appliance.

5. The method of claim 1, further comprising:
wherein a first deployment device is designated as a deployment server; and
designating a second deployment device as the deployment server to replace the first deployment device as the deployment server; and
deploying the second copy of the first agent by the deployment server.

6. The method of claim 1, further comprising:
storing in the network appliance a list of the discovered one or more computing devices, wherein the list of the discovered one or more computing devices comprises one or more entries, wherein the one or more entries comprises whether the second copy of the first agent was deployed to the at least one of the discovered one or more computing devices.

7. The method of claim 6, further comprising:
wherein the list of the discovered one or more computing devices includes the second computing device; and
updating the list of the discovered one or more computing devices to indicate that the second computing device has received the second copy of the first agent.

8. The method of claim 1, wherein the discovery device is a bastion host.

9. A system comprising:
a memory comprising instructions executable by one or more processors; and
the one or more processors coupled to the memory and operable to execute the instructions, the one or more processors being operable when executing the instructions to:
deploy, by a network appliance in a first network domain, a first copy of a first agent to a discovery device in a second network domain, wherein the first network domain and the second network domain are distinct;

establish a first persistent connection between the network appliance and the discovery device;

send a discovery request to the discovery device, wherein the network appliance sends the discovery request via the first agent to the first copy of the first agent, and wherein the discovery request comprises a request to the discovery device to discover one or more computing devices in the second network domain;

receive, at the network appliance, information related to the discovered one or more computing devices in the second network domain;

send a deployment request to the discovery device via the first agent to the first copy of the first agent to deploy a second copy of the first agent to at least one of the one or more computing devices;

deploy a second copy of the first agent to at least one of the discovered one or more computing devices, wherein the deploying is based, at least in part, on the at least one of the discovered one or more computing devices including a copy of the first agent;

establish a second persistent connection between the network appliance and the at least one of the discovered one or more computing devices;

distinguish visually to a web-based interface the discovered one or more computing devices with the second copy of the first agent deployed from the discovered one or more computing devices without any copy of the first agent deployed; and send one or more commands by the network appliance via the first agent to the second copy of the first agent to the at least one of the discovered one or more computing devices.

10. The system of claim 9, wherein the second copy of the first agent is deployed to the at least one of the discovered one or more computing devices by at least one of the network appliance or a deployment server, wherein the deployment server is connected to the network appliance, and wherein the deployment server deploys the second copy of the first agent in response to a deployment request from the network appliance.

11. The system of claim 9, wherein the second copy of the first agent is deployed by a deployment server, and wherein the deployment server is the discovery device.

12. The system of claim 9, wherein the second copy of the first agent is deployed by a deployment server, wherein the deployment server is a second computing device, and wherein the second computing device includes a third copy of the first agent and is persistently connected to the network appliance.

13. The system of claim 9, wherein the memory coupled to the processors further comprise instructions executable by the processors, the processors being operable when executing the instructions to:
wherein a first deployment device is designated as a deployment server; and
designate a second deployment device as the deployment server to replace the first deployment device as the deployment server; and
deploy the second copy of the first agent by the deployment server.

14. The system of claim 9, wherein the memory coupled to the processors further comprise instructions executable by the processors, the processors being operable when executing the instructions to:
store in the network appliance a list of the discovered one or more computing devices, wherein the list of the discovered one or more computing devices comprises one or more entries, wherein the one or more entries comprises whether the second copy of the first agent was deployed to the at least one of the discovered one or more computing devices.

15. The system of claim 14, wherein the memory coupled to the processors further comprise instructions executable by the processors, the processors being operable when executing the instructions to:
wherein the list of the discovered one or more computing devices includes the second computing device; and
update the list of the discovered one or more computing devices to indicate that the second computing device has received the second copy of the first agent.

16. The method of claim 9, wherein the discovery device is a bastion host.

17. A network appliance comprising:
one or more processors;
one or more memories;
one or more software modules for performing one or more system-management functionalities;
a first network domain, wherein the first network domain comprises the network appliance;
a first agent deployed at the network appliance;
a discovery device of a second domain in communication with the network appliance via a first copy of the first agent executing on the discovery device for discovering one or more network devices, wherein the first network domain and the second network domain are distinct;
wherein the network appliance comprises the first copy of the first agent and an installation script associated with the first agent for installing the first copy of the first agent on at least one of discovered the one or more network devices via the discovery device;
one or more persistent connections connecting the network appliance to at least one of the discovered one or more network devices via the first copy of the first agent;
a deployment request that comprises a request to the first copy of the first agent of the discovery device from the first agent of the network appliance to deploy a second copy of the first agent to at least one of the one or more discovered computing devices;
a konductor on the network appliance, wherein the konductor maintains a list of tasks to be performed by the first copy of the first agent on the at least one of the discovered one or more network devices, and wherein the konductor assigns one or more tasks from the list of tasks to a selected copy of the first agent at a selected network device of the discovered one or more network devices;
information related to the discovered one or more computing devices in the second network domain stored at the network appliance;
a web-based interface for interacting with the network appliance via web browser executing on one or more of the one or more network devices;
a visual representation at the web-based interface that distinguishes the discovered one or more computing devices with the second copy of the first agent deployed from the discovered one or more computing devices without any copy of the first agent deployed;
one or more commands comprising one or more instructions from the first agent to the second copy of the first agent at the at least one of the discovered one or more computing devices; and
wherein the one or more system-management functionalities is a subset of system-management functionalities of the network appliance.

18. The network appliance of claim 17, wherein each processor implements advanced reduced instruction set computer machine architecture.

19. The network appliance of claim 17, wherein the one or more memories comprise one or more double data rate synchronous dynamic random access memories and one or more solid state drives.

20. The network appliance of claim 17, wherein the one or more system-management functionalities comprise one or more of license compliance, software patching, software inventory, data backup, or device security.

* * * * *